(12) United States Patent
Lambert

(10) Patent No.: US 9,113,330 B2
(45) Date of Patent: *Aug. 18, 2015

(54) WIRELESS AUTHENTICATION USING BEACON MESSAGES

(71) Applicant: MARVELL WORLD TRADE LTD., St. Michael (BB)

(72) Inventor: Paul A. Lambert, Mountain View, CA (US)

(73) Assignee: MARVELL WORLD TRADE LTD. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,129

(22) Filed: Apr. 2, 2014

(65) Prior Publication Data

US 2014/0215594 A1 Jul. 31, 2014

Related U.S. Application Data

(63) Continuation of application No. 13/462,972, filed on May 3, 2012, now Pat. No. 8,694,782.

(60) Provisional application No. 61/482,520, filed on May 4, 2011.

(51) Int. Cl.
| | |
|---|---|
| *H04W 12/04* | (2009.01) |
| *H04L 9/32* | (2006.01) |
| *H04L 9/08* | (2006.01) |
| *H04L 29/06* | (2006.01) |
| *H04L 12/06* | (2006.01) |
| *G06F 15/173* | (2006.01) |
| *H04W 12/06* | (2009.01) |

(Continued)

(52) U.S. Cl.
CPC .......... *H04W 12/04* (2013.01); *H04L 9/0844* (2013.01); *H04L 9/3263* (2013.01); *H04L 63/0823* (2013.01); *H04W 12/06* (2013.01); *H04L 2209/80* (2013.01); *H04W 48/08* (2013.01); *H04W 84/12* (2013.01); *H04W 88/12* (2013.01)

(58) Field of Classification Search
CPC ..... H04W 12/04; H04W 12/06; H04W 88/12; H04W 84/12; H04W 48/08; H04L 9/3263; H04L 9/0844; H04L 63/0823; H04L 2209/80
See application file for complete search history.

(56) References Cited

U.S. PATENT DOCUMENTS

| | | |
|---|---|---|
| 7,333,464 B2 | 2/2008 | Yang et al. |
| 7,516,325 B2 | 4/2009 | Willey |

(Continued)

OTHER PUBLICATIONS

Azad Jiwa, Jennifer Seberry and Yuliang Zheng, Beacon based authentication, 1994 European Symposium on Computer Security (ESORICS'94), ed. D.Gollmann, 875, Lecture Notes in Computer Science, Springer-Verlag, Berlin, 1994, pp. 125-142.*

(Continued)

*Primary Examiner* — Tae Kim
*Assistant Examiner* — Louis Teng

(57) ABSTRACT

Systems, methods, and other embodiments associated with wireless authentication using beacon messages are described. According to one embodiment, a controller includes logic configured to control a transmitter to wirelessly transmit a beacon message. The beacon message is configured to announce to a remote device that a wireless device is available to communicate. The beacon message includes a security identifier that identifies a public key for the wireless device.

20 Claims, 6 Drawing Sheets

(51) Int. Cl.
  *H04W 48/08* (2009.01)
  *H04W 84/12* (2009.01)
  *H04W 88/12* (2009.01)

(56) References Cited

U.S. PATENT DOCUMENTS

| | | | |
|---|---|---|---|
| 7,788,491 B1 * | 8/2010 | Dawson | 713/168 |
| 7,835,725 B2 | 11/2010 | Suzuki et al. | |
| 8,094,822 B2 | 1/2012 | Suzuki | |
| 8,189,608 B2 * | 5/2012 | Duo et al. | 370/401 |
| 8,483,718 B2 | 7/2013 | Hwang | |
| 8,510,561 B2 * | 8/2013 | Little | 713/171 |
| 2002/0103930 A1 | 8/2002 | Kamentsky et al. | |
| 2005/0185596 A1 | 8/2005 | Kamentsky et al. | |
| 2005/0271207 A1 * | 12/2005 | Frey | 380/263 |
| 2007/0242643 A1 | 10/2007 | Chandra et al. | |
| 2009/0059841 A1 | 3/2009 | Laroia et al. | |
| 2009/0080389 A1 | 3/2009 | Messerges et al. | |
| 2009/0131061 A1 | 5/2009 | Palanki et al. | |
| 2009/0217043 A1 | 8/2009 | Metke et al. | |
| 2011/0211564 A1 | 9/2011 | Yoneyama et al. | |
| 2011/0231649 A1 | 9/2011 | Bollay et al. | |
| 2011/0231652 A1 | 9/2011 | Bollay et al. | |

OTHER PUBLICATIONS

Park, J. H., Kim, H. J., Sung, M. H., & Lee, D. H. (2008). Public key broadcast encryption schemes with shorter transmissions.IEEE Transactions on Broadcasting, 54(3).*

Dirk Balfanz, D. K. Smetters, Paul Stewart and H. Chi Wong, Talking to Strangers: Authentication in Ad-Hoc Wireless Networks, In Proceedings of Network and Distributed System Security Symposium, Feb. 2002.*

R. Chandra, J. Padhye, L. Ravindranath and A. Wolman. Beacon-stuffing: Wi-fi without associations. Eighth IEEE Workshop on Mobile Computing Systems and Applications pp. 7. 2007.*

Edney and Arbaugh, 802.11 security. wi-fi protected access and 802.11i, 2003, Addison-Wesley Longman Publishing Co., Inc., Chapter 12, How CCMP is Used in RSN.*

* cited by examiner

WIRELESS AUTHENTICATION USING BEACON MESSAGES

CROSS REFERENCE TO RELATED APPLICATIONS

The patent disclosure is a continuation of U.S. patent application Ser. No. 13/462,972 filed May 3, 2012, now U.S. Pat. No. 8,694,782, which claims benefit under 35 USC §119(e) to U.S. Provisional Application No. 61/482,520 filed on May 4, 2011, which are both hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Wireless networks provide a convenient way for devices to access computer networks. Access by many different devices and access from many different locations become simple when cumbersome wiring is replaced with the ability to connect wirelessly. However, as the popularity of wireless networks grow security issues unique to this form of communication are more likely to be exploited.

A wireless access point (WAP) is a device that allows wireless devices to connect to a wired computer network. Wireless communications present many security difficulties. For example, communications between the wireless access point and wireless client devices are vulnerable to eavesdropping and attacks by malicious users. To provide security against these threats, devices typically encrypt the wireless communications. However, using encryption to secure a wireless network is not without difficulties. Protocols that define how a wireless access point and clients interact are continuously changing and are often difficult and time consuming to configure.

Often, information technology professionals or other skilled persons configure devices for wireless access. A basic configuration process may include manual entry of data and the exchange of configuration information between devices. Additionally, once the basic configuration is complete authentication and connection of a device can be slow due to a multiplicity of communications between a device and the wireless access point. Accordingly, methods of connecting to wireless networks may be inefficient.

SUMMARY

In one embodiment, a controller includes logic configured to control a transmitter to wirelessly transmit a beacon message. The beacon message is configured to announce to a remote device that a wireless device is available to communicate. The beacon message includes a security identifier that identifies a public key for the wireless device.

In one embodiment, a method includes generating a beacon message. The beacon message includes a security identifier that identifies a public key for a wireless device. The method includes transmitting the beacon message to announce to a remote device that the wireless device is available to communicate.

In one embodiment, an integrated circuit includes transmitter logic configured to control a transmitter to wirelessly transmit a message. The message is configured to announce to a remote device that a wireless device is available to communicate. The message includes a security identifier for the wireless device. The integrated circuit includes authentication logic configured to determine whether a reply received from the remote device in response to the message includes security information that completes an authentication exchange with the remote device.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example methods, apparatus, and other embodiments associated with efficient wireless authentication using beacon messages. For example, a wireless access point may use beacon messages to announce the presence and availability of the wireless access point to remote devices within proximity of the wireless access point. Beacon messages may include information about the configuration of the wireless access point that remote devices use when connecting to a wireless network provided by the wireless access point. In one embodiment, the beacon message is configured to initiate an authentication exchange with a remote device by including security information in the beacon message. In this way, additional information is included in the beacon message and the number of messages exchanged between the wireless access point and the remote device may be reduced. As a result of using the beacon message in this way, establishing a connection to the wireless access point may occur in less time.

In one embodiment, a public key for the wireless access point is included in the beacon message. The remote device, upon receiving the beacon message, determines that the public key is present and then may immediately use the public key to encrypt a reply sent back to the wireless access point. Thus, including the public key in the beacon message may permit the remote device to securely communicate with the wireless access point without exchanging multiple sets of insecure messages and therefore more efficiently communicate information to establish a trusted secure connection.

Figure 1:
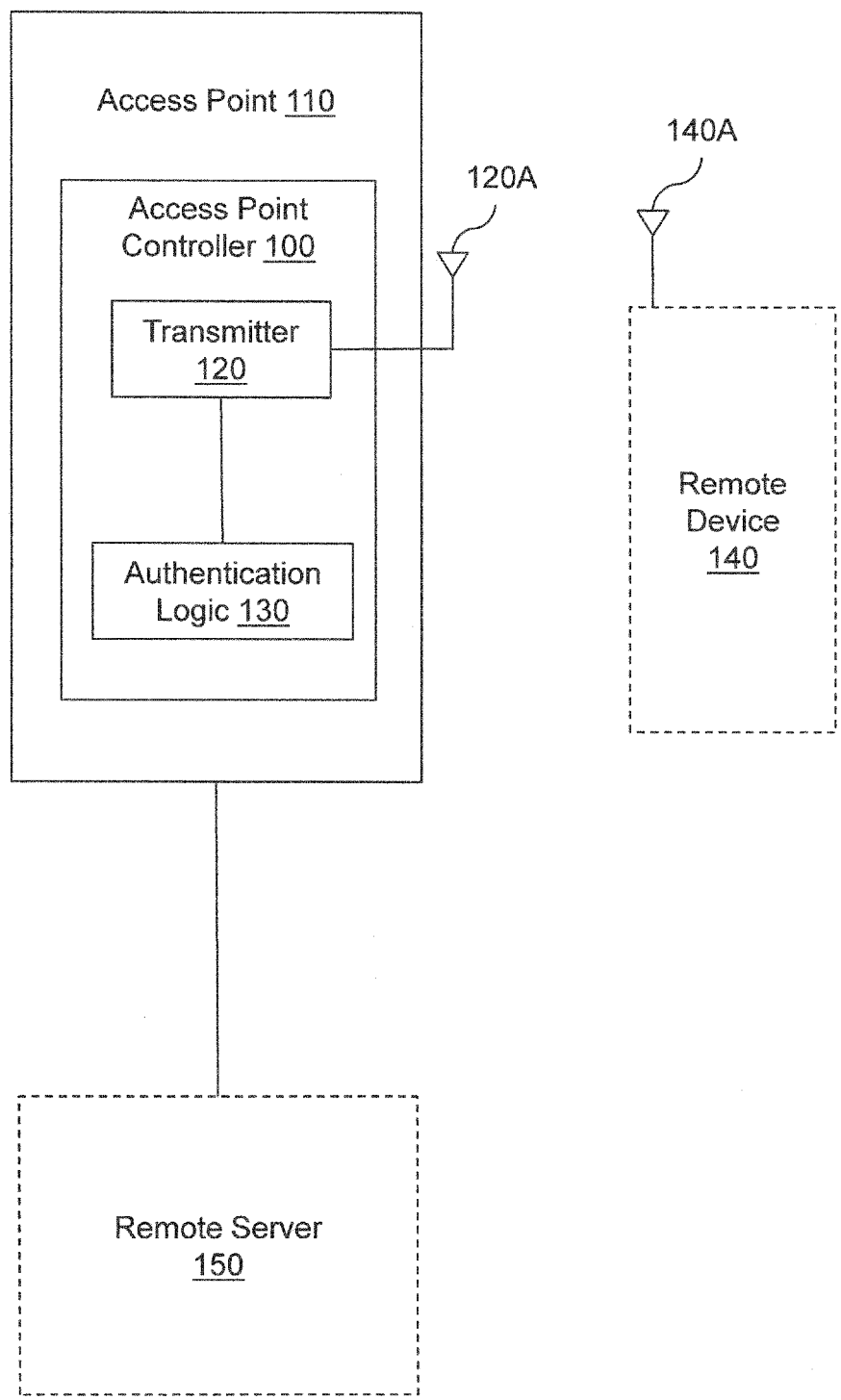
FIG. 1 illustrates one embodiment of an access point controller associated with wireless authentication using beacon messages.

With reference to FIG. 1, one embodiment of an access point controller 100 is shown that is associated with efficient wireless authentication using beacon messages. In the following example, consider that the access point controller 100 is part of an access point 110 and that the access point 110 provides access to a computer network (e.g., remote server 150) for remote devices that are present in a transmission footprint of the access point 110. The access point controller 100 includes at least a transmitter 120 for controlling wireless transmissions via antenna 120A and authentication logic 130 for authenticating a remote device, which is described below.

When a nearby remote device (e.g. remote device 140) initially enters the footprint (e.g., transmission range) of access point 110, the remote device is not connected to the wireless network and is not aware of the configuration of access point 110. To let the nearby devices know that the access point 110 is present, the access point controller 100 causes, for example, the transmitter 120 to transmit beacon messages over the wireless network via the antenna 120A (which may be internal and/or part of a chip). In this way, the access point 110 uses the beacon message to announce the availability of the wireless network and to provide discovery information to the remote device 140 for connecting to the wireless network through the access point 110. In one embodiment, the discovery information outlines the configuration and the capabilities of the access point 100.

When the remove device 140 is within the transmission range, the remote device 140 receives the beacon message via antenna 140A and uses the discovery information to configure a reply when attempting to establish a connection with the access point 110. Along with the discovery information, the access point controller 100 inserts a security identifier(s) in the beacon message.

By including the security identifier in the beacon message, the beacon message causes the remote device 140 to initiate an authentication exchange with the access point 110 prior to an exchange of any additional messages. In this way, the access point 110 may avoid exchanging intervening communications that would occur, for example, to exchange the security identifier if it was not included in the beacon message. Thus, adding the security identifier to the beacon message may reduce the time to authenticate and to establish a connection with the remote device 140 since fewer messages may be exchanged.

In one embodiment, the transmitter 120 is configured to modify the beacon message to include the security identifier or, the transmitter 120 may repurpose an existing field in the beacon message to include the security identifier. In this way, additional information embodied by the security identifier is included in the beacon message when transmitted to the remote device 140. For example, the remote device 140 uses the security identifier when replying to the beacon message. Consider that the security identifier may provide the remote device 140 with additional information that would not otherwise be available with the beacon message. The additional information may include information that would otherwise not be exchanged without several intervening requests and replies between the access point 110 and the remote device 140.

In one embodiment, the security identifier in the beacon message is a public key of a public/private asymmetric key pair for the access point 110. Having the public key permits the remote device 140 to secure communications to the access point 110 immediately after receiving the beacon message. Thus, the remote device 140 may encrypt sensitive information in a reply sent to the access point 110 using the public key from the beacon message without having to exchange additional messages to obtain the public key. Furthermore, using the public key of the access point 110, the remote device 140 may send sensitive information to the access point 110 that may be used to construct a secure shared secret directly from the beacon message and prevent eavesdropping or other malicious intrusion early in the communication sequence.

The beacon message modified with the public key may be used for other functions. In one embodiment, the remote device 140 may use the public key from the beacon message to authenticate the access point 110 before replying to the beacon message. In this manner, the remote device 140 can ensure that the access point 110 is trusted and not a malicious device (e.g., intruder, spoofer). When authenticating the access point 110, the remote device 140 may use the public key of the access point 110 to decrypt a message authentication code (MAC) in the beacon message, provide the security identifier to a third party service (e.g., remote server 150) for verification, authenticate the security identifier against an internal trusted list, and so on.

In other embodiments, rather than containing the actual public key, the security identifier in the beacon message may be a hash of the public key, an identifier of the public key, a certificate of the access point 110 that includes the public key, a location from where to retrieve the public key, and so on. When the security identifier does not include the public key but instead includes an identifier of the public key, the remote device 140 may request the public key from a third party server (e.g., remote server 150) or other authentication device or service that can appropriately process the security identifier. Thus, in one embodiment, additional security is integrated into the process by requiring the public key to be retrieved from a trusted source using the security identifier. Accordingly, by providing the security identifier in the beacon message, the access point 110 provides a robust mechanism for efficiently establishing secure communications and/or a trust relationship between devices.

In one embodiment, since the remote device 140 can authenticate the access point 110 from the information in the beacon message, the remote device 140 may generate a reply in response to the beacon message that completes the authentication exchange between access point 110 and the remote device 140. The authentication exchange is, for example, an exchange of cryptographic information for constructing a shared secret key, a mutual authentication handshake, and so on. The authentication exchange is complete if, for example, information to construct a shared secret key has been exchanged upon receipt of the reply from the remote device 140.

When the access point 110 receives the reply, the authentication logic 130 processes the reply to determine whether the reply is in the correct form and includes certain information (e.g., cryptographic key information) to complete the authentication exchange. For example, the authentication logic 130 may determine whether the reply includes security information by determining whether the reply or a portion of the reply is encrypted with the public key from the access point 110 (which would have been part of the beacon message). In one example, if the reply is encrypted with the public key then the authentication logic 130 will be able to decrypt the reply with the corresponding private portion of the key pair to reveal the encrypted information. If the decryption fails, then the authentication logic 130 knows that the encryption did not use the public key from the access point 110 and the authentication process terminates and/or an unsecure exchange can begin.

If the decryption is successful, then in one embodiment, the authentication logic 130 uses the decrypted information to construct a shared symmetric cryptographic key for securely communicating with the remote device 140. Additionally, the authentication logic 130 may authenticate the remote device 140 as a trusted device. To authenticate the remote device 140, the authentication logic 130 may provide the security information to the remote server 150 that performs authentication, compare the security information against a database of authenticated devices, and so on. In one example, the remote server 150 is a Remote Authentication Dial In User Service (RADIUS) server that provides centralized authentication, authorization, and accounting management for computers in a network.

In one embodiment, the security information in the reply may be, for example, a public key of the remote device 140, security credentials of the remote device 140 such as a trusted certificate, a cryptographic nonce for a secure key negotiation, and so on. For example, consider that the authentication exchange may include exchanging security information for constructing a secret symmetric key. In one embodiment, the access point 110 and the remove device 140 use the secret symmetric key to encrypt and thereby protect communications from eavesdropping and other unwanted intrusion. The secret symmetric key may be a groupwise transient key (GTK), or other symmetric key that is kept private to maintain integrity of the key. Thus, the beacon message may include a first cryptographic secret (e.g., a first cryptographic nonce) used in constructing such a key.

Additionally, the reply from the remote device 140 may include a second cryptographic secret (e.g., a second cryptographic nonce) for constructing the secret symmetric key. Data exchanged between the remote device 140 and the access point 110 during the authentication exchange may be data in compliance with a Diffie-Hellman key exchange, an Extensible Authentication protocol (EAP), IEEE 802.1X, IEEE 802.11i, IEEE 802.11ai, WiFi Protected Access (WPA), WPA2 (e.g., WPA2 4-way handshake), Robust Security Network (RSN) protocol, and so on. Accordingly, once the remote device 140 provides a reply in response to the beacon message, the authentication exchange is effectively complete if the reply includes the correct information.

Figure 2:
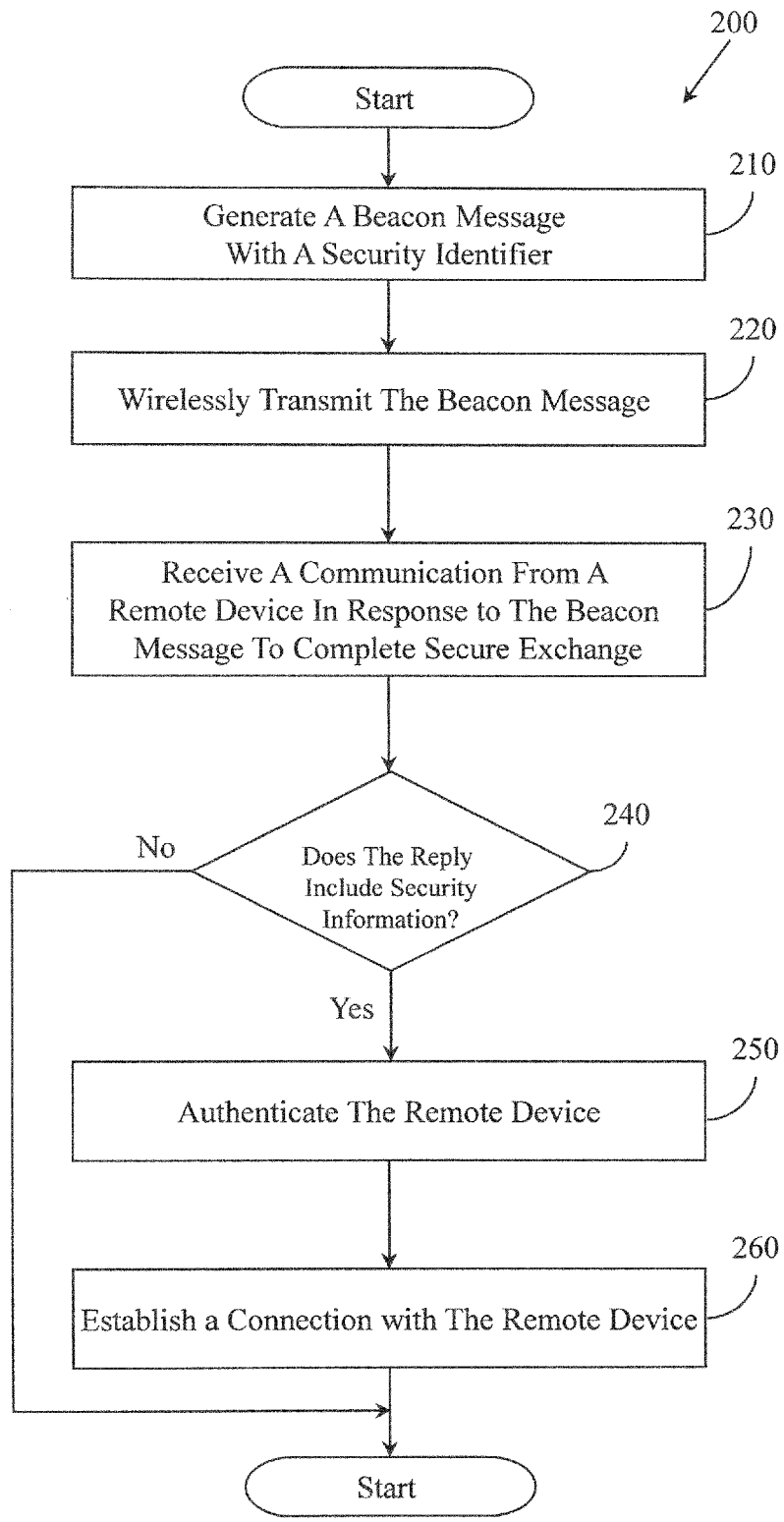
FIG. 2 illustrates one embodiment of a method associated with wireless authentication using beacon messages.

Further details of the authentication exchange and using the beacon message to communicate the security identifier will be discussed in conjunction with FIG. 2. FIG. 2 illustrates a method 200 associated with efficient wireless authentication using beacon messages. FIG. 2 is discussed from the perspective that the method 200 is implemented and performed by a wireless access point (e.g., access point 110) to establish a secure connection with a remote device (e.g., remote device 140) over a wireless network. It should be understood that method 200 may support an exchange with multiple remote devices within the footprint of the access point in parallel. The following discussion of a single remote device is provided as an illustrative example.

At 210 of method 200, the access point generates a beacon message. In one embodiment, to generate the beacon message, the access point may modify a standard beacon message (e.g., an IEEE 802.11 beacon frame) by adding additional fields or by reassigning existing fields to include a security identifier. Depending on a protocol implemented by the access point to authenticate remote devices, the security identifier may be an identifier of a public key of a public/private key pair for a wireless access point, the public key itself, and/or other security information.

At 220, the access point wirelessly transmits the beacon message. In one embodiment, wirelessly transmitting the beacon message includes transmitting the beacon message as a broadcast, multicast transmission or a peer-to-peer (P2P) communication in order to provide the beacon message to remote devices (e.g., remote device 140) within proximity of the access point. As previously explained, the beacon message announces the presence and availability of the access point to remote devices that are listening and capable of establishing a connection to the wireless network. In this way, the beacon message may communicate discovery information that is used by remote devices when attempting to establish a connection to the access point.

In one embodiment, by providing the security identifier in the beacon message, the access point may induce a remote device to initiate an authentication exchange with the access point. However, in one embodiment, for the remote device to initiate the authentication exchange, the remote device first needs to recognize that the beacon message includes the security identifier. Accordingly, the remote device may be configured to process the beacon message and check for the security identifier prior to replying to the beacon message. In this way, the remote device may authenticate the access point and/or provide security information in the reply to the beacon message to complete the authentication exchange.

For example, when a remote device is configured to participate in an efficient authentication exchange, a reply from the remote device in response to the beacon message (that includes a security identifier) will include security information. The access point then uses the security information (e.g., security credentials of the remote device, cryptographic secret) to authenticate the remote device and/or to construct a shared secret key. The cryptographic secret is, for example, a pseudorandom number, a nonce, or other information that may be used when constructing a cryptographic key.

At 230 of method 200, the access point receives a reply to the beacon message from the remote device. In one embodiment, upon receiving the reply the access point is not yet aware of whether the remote device has initiated the authentication exchange based on the security identifier from the beacon message. However, at 240, the method determines whether the reply includes security information that is indicative of the authentication exchange or, for example, whether the reply includes information indicating that the remote device is requesting to connect in accordance with a secondary policy.

In one embodiment, at 240, the access point determines whether the reply includes the security information by decrypting a portion (e.g., a payload) of the reply using the private key of the public/private key pair for the access point. Alternatively, the reply may include a field that indicates if the security information is included. If, at 240, the reply includes the security information then the access point proceeds to 250 where the access point attempts to authenticate the remote device. If the remote device is authenticated then method 200 proceeds to 260 where the connection is established and finalized. Thus, if the remote device replies with the correct security information then only two messages may need to be exchanged between the access point and the remote device to complete the authentication exchange. Accordingly, the access point or, in one embodiment, a wireless device that is not an access point can communicate securely with the remote device by exchanging just two messages. The wireless device may then provide access to a network, a mesh network with peer-to-peer communications, direct services (e.g., printer), storage (e.g., network storage or memory), MEM and so on.

Figure 3:
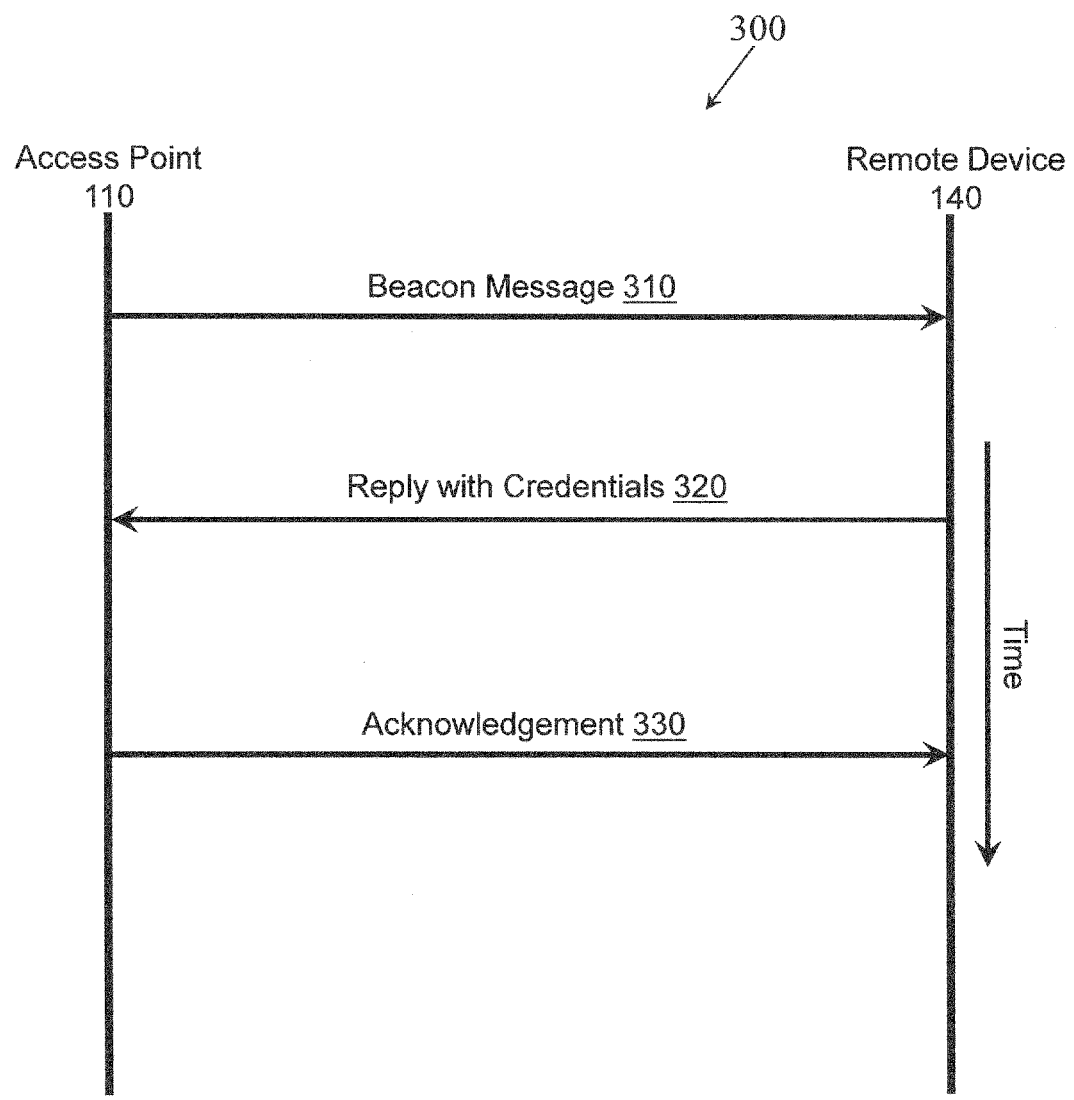
FIG. 3 illustrates one example of a timing diagram for messages transmitted in a wireless authentication exchange.

An example of a sequence of communication exchanges will be discussed with reference to FIG. 3. With reference to FIG. 3, a sequence of communications 300 is illustrated. Sequence 300 is an exchange of transmissions between the access point 110 and the remote device 140. In sequence 300, the access point 110 transmits a beacon message 310 that includes a security identifier as discussed previously. Here, the remote device 140 is configured to initiate the authentication sequence upon receiving a beacon message with a security identifier. Thus, the authentication exchange begins in the remote device 140 by the remote device 140 authenticating the access point 110 using information included in the security identifier from the beacon message 310.

After the remote device 140 authenticates the access point 110, a reply 320 is constructed to include security credentials of the remote device 140. The security credentials are, for example, for use by the access point 110 in authenticating the remote device 140 and/or for constructing a shared secret. The remote device 140 may then encrypt the reply 320 or a portion of the reply 320 (e.g., a payload) to obscure included security information. The remote device then transmits the reply 320 to the access point 110 to complete the authentication exchange. As illustrated in sequence 300, two messages with an optional third message that is an acknowledgement 330 of completion of the authentication exchange may be transmitted between devices to share a secret key and mutually authenticate.

Figure 4:
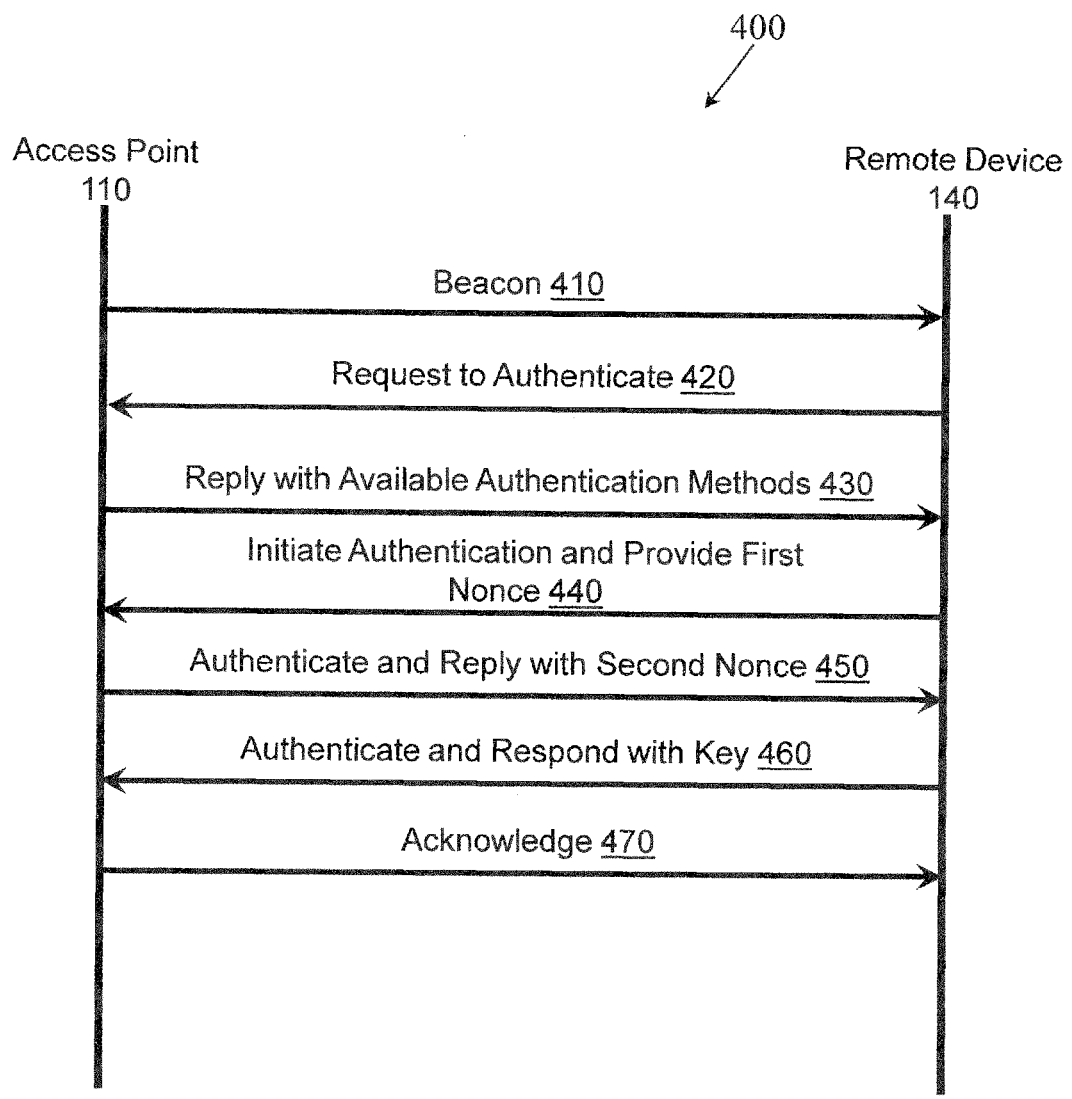
FIG. 4 illustrates another example of a timing diagram for messages transmitted in a wireless authentication exchange.

By contrast, if the reply to the beacon message is not in the appropriate form (e.g., does not include security credentials) then an alternative secondary exchange, as illustrated in sequence 400 of FIG. 4, may occur. FIG. 4, illustrates an example where the remote device 140 is not configured to participate in the efficient authentication exchange or otherwise chooses not to participate in the efficient exchange. In either case, the series of messages that follows is more complex and may consume more time than the sequence 300 as illustrated in FIG. 3. For example, sequence 400 begins with beacon message 400 that may include a security identifier to initiate the authentication exchange in the remote device 140.

However, in sequence 400, the remote device 140 replies with, for example, a request to authenticate 420 that does not include the security information and/or is not properly encrypted. Thus, the access point 110 determines (e.g., at 240 of method 200 in FIG. 2) that the security information is not present and proceeds to transmit a reply 430 that indicates available authentication methods. By transmitting message 430 to the remote device 140, the devices may discover and negotiate a protocol that both devices support. However, reply 430 already represents an increase in the complexity of the exchange between the devices. For example, reply 430 exceeds the exchange in sequence 300 of FIG. 3 by one message. Additionally, when the reply 430 is transmitted, the devices have not yet finished negotiating a common protocol to use whereas sequence 300 is complete at this number of transmissions. The remaining transmissions in sequence 400 (e.g., 440, 450, 460, 470) illustrate one example of a sequence of messages that may occur to establish a similar connection as that achieved in sequence 300 with, however, more transmissions than sequence 300 since the security identifier in the beacon message is not used in sequence 400. The transmissions 440, 450, 460, 470 represent a common process of authentication and will not be discussed in detail here. They are provided only to demonstrate their relative complexity and number of messages as compared to the process and sequence of FIGS. 2 and 3.

Figure 5:
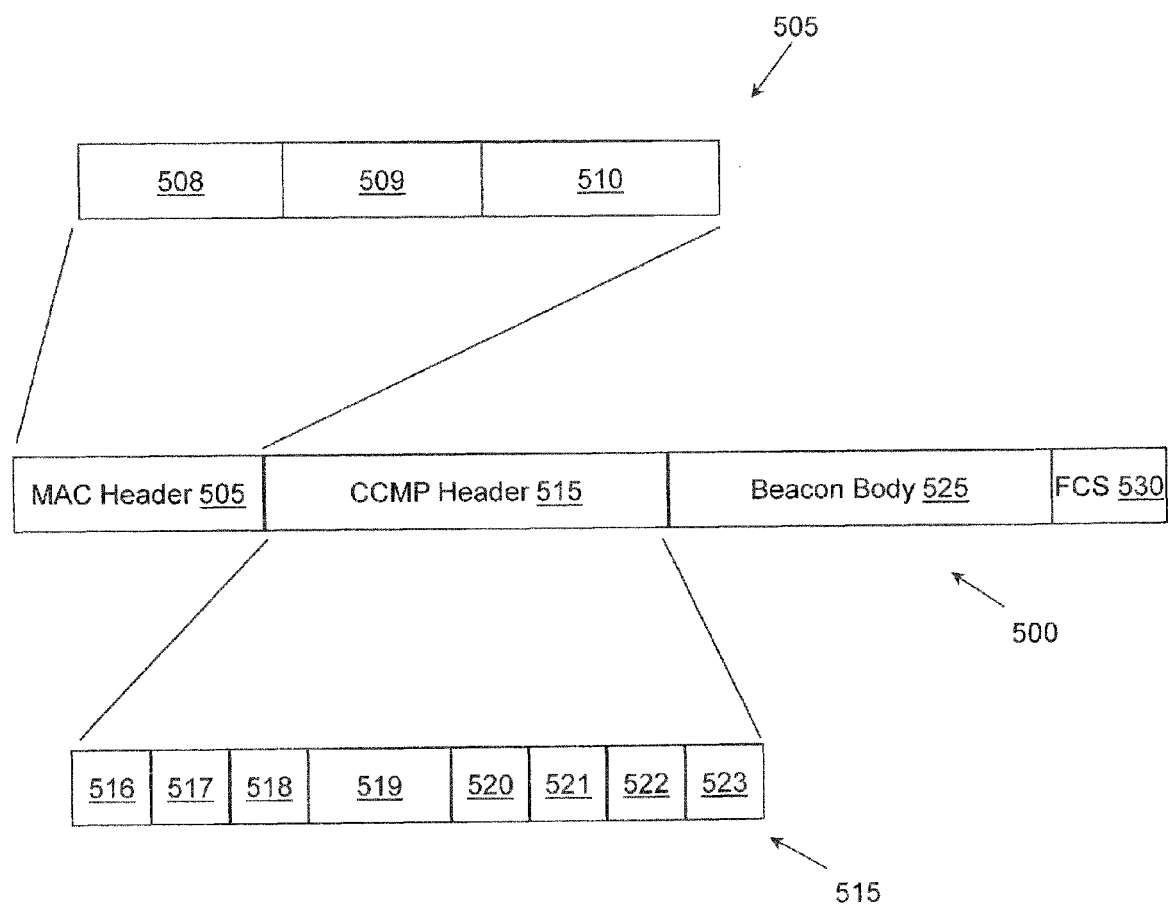
FIG. 5 illustrates one embodiment of a beacon message associated with wireless authentication.

FIG. 5 illustrates one embodiment of a beacon message 500 that includes a security identifier, as discussed previously, that may be used by a wireless access point. Of course, different protocols may have different beacon message configurations and thus the present systems and methods can be adjusted accordingly and are not limited by the illustrated example. The beacon message 500 may include a sequence of fields. In one example, the sequence of fields include a media access control (MAC) header 505, a Counter Mode with Cipher Block Chaining Message Authentication Code Protocol (CCMP) header 515, a beacon frame body 525, and a Frame Check Sequence (FCS) field 530.

The MAC header 505 includes a series of subfields (e.g., 508, 509, 510, etc.). The subfields of the MAC header 505 include information used to send the packet between nodes in a network. It should be understood that in different embodiments MAC header 505 may include more or less fields as appropriate for the implementation and as is compatible with the implemented standard (e.g., IEEE 802.11-2007 standard or other standard).

The MAC header 505 subfields 508-510 may be address fields. For example, address field 508 includes a 48-bit destination MAC address. The address field 509 includes a 48-bit MAC address of an AP that is sending the packet. The address field 510 is a 48-bit MAC address of a device that initiated the packet. The address field 510 indicates the original source of the packet. Address fields 508, 509, and 510 indicate layer 2 MAC addresses of devices involved in sending and receiving the packet. The address field 508 indicates, for example, a broadcast destination address. In this way, the beacon message 500 is communicated to remote devices within a transmission range of the wireless access point.

In one embodiment, the CCMP header 515 may be used to indicate the security identifier used to initiate the authentication exchange with remote devices. The CCMP header 515 may include a 48-bit packet number divided between six packet number fields 516, 517, 520, 521, 522, and 523. The packet number fields may be one element used as the security identifier. The CCMP header 515 also includes a reserved field 518 and a key ID field 519. The key ID field 519 and the reserved field 518 may also be used for the security identifier. In other embodiments, other fields may be used for the security identifier or additional fields can be added to the beacon message to accommodate the security identifier.

In one embodiment, the key ID field 519 is used in combination with a source address and/or access point address as the security identifier. For example, the combination of the key ID field 519 and the access point source address may be used to bind a public key to the access point. A remote device may then use this combination to verify that the access point is trusted. It should be understood that in other embodiments the CCMP header 515 may include more or less fields as appropriate for the implementation and as is compatible with a selected standard (e.g., the IEEE 802.11-2007 standard or other implemented standard). In one embodiment, simply including the CCMP header in the beacon message may serve to act as the security identifier. Additionally, in other embodiments, the CCMP header may not be included in the beacon message 500.

Continuing with the beacon message 500, the beacon body 525 is the portion of the beacon message 500 that includes discovery information and may also include the security identifier. The FCS field 530 includes an error checking segment to ensure the beacon message 500 does not include any errors. In one embodiment, the FCS 530 includes a cyclic redundancy check (CRC) value for the beacon message 500.

Figure 6:
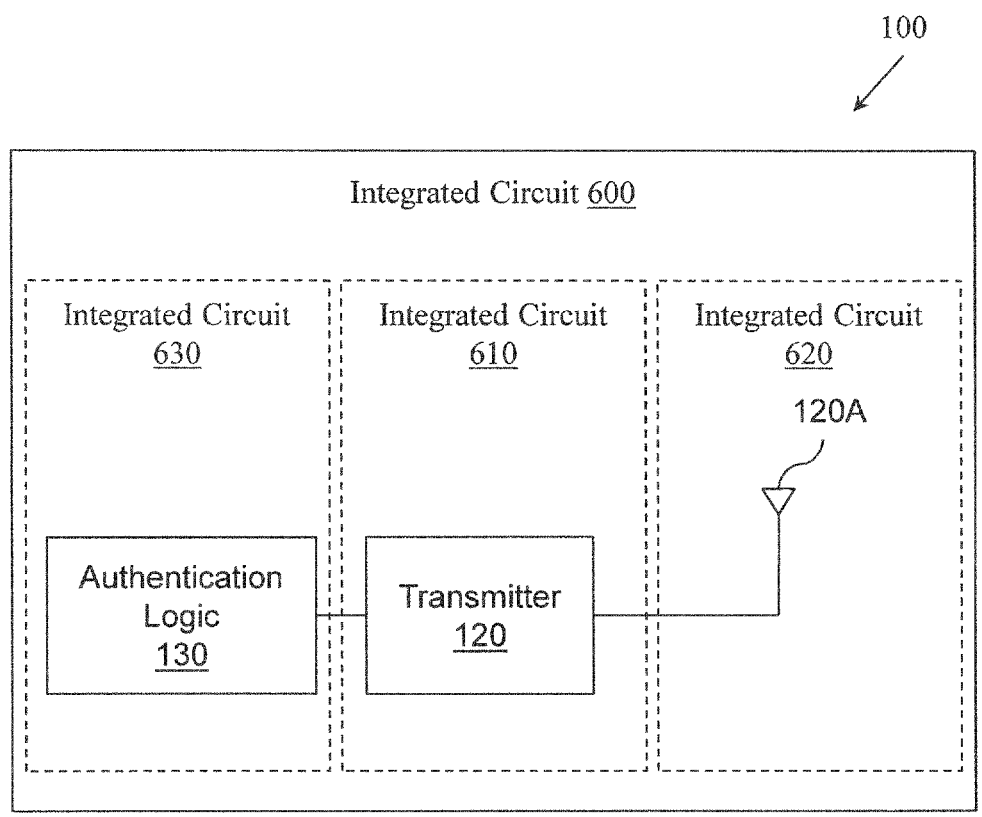
FIG. 6 illustrates one embodiment of an integrated circuit associated with wireless authentication using beacon messages.

FIG. 6 illustrates an additional embodiment of the access point controller 100 from FIG. 1 that is configured with separate integrated circuits and/or chips. In this embodiment, the transmitter 120 from FIG. 1 is embodied as a separate integrated circuit 610. Additionally, the authentication logic 130 is embodied on an individual integrated circuit 630. The antenna 120A is also embodied on an individual integrated circuit 620. The circuits are connected via connection paths to communicate signals. While integrated circuits 610, 620, and 630 are illustrated as separate integrated circuits, they may be integrated into a common circuit board 600. Additionally, integrated circuits 610, 620, and 630 may be combined into fewer integrated circuits or divided into more integrated circuits than illustrated. Additionally, in another embodiment, the transmitter 120 and the authentication logic 130 illustrated in integrated circuits 610 and 630 may be combined into a separate application specific integrated circuit. In other embodiments, portions of the functionality associated with the transmitter 120 and the authentication logic 130 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor programmed to perform one or more of the disclosed functions, discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims. The methods described herein are limited to statutory subject matter under 35 U.S.C §101.

What is claimed is:

1. A controller including at least a processor, comprising:
   logic implemented in at least hardware and configured to generate a beacon message with a security identifier in a Counter Mode Cipher Block Chaining Message Authentication Code Protocol (CCMP) header of the beacon message,
   wherein the hardware logic is configured to control a transmitter to wirelessly transmit the beacon message,
   wherein the beacon message is configured to announce to a remote device that a wireless device is available to communicate, and wherein the security identifier identifies a public key for the wireless device,
   wherein the beacon message does not include the public key, wherein the security identifier causes the remote device to obtain the public key from a third party, and
   wherein the security identifier and an address of the wireless device correlate the wireless device with the public key of the wireless device when the remote device retrieves the public key from the third party.

2. The controller of claim 1, wherein the security identifier in the beacon message is configured to cause the remote device to initiate an authentication exchange with the wireless device by causing the remote device to transmit a reply to the wireless device that includes security credentials of the remote device.

3. The controller of claim 1, wherein the logic is configured to cause the transmitter to modify the beacon message to include the security identifier, wherein the beacon message is configured to announce that the wireless device is available to provide access to a network, wherein the logic is configured to cause the transmitter to transmit the beacon message as a broadcast message, a multicast message or a peer-to-peer communication, wherein the logic is configured to control the wireless device to provide access to a mesh network, to provide direct services or to provide access to network memory.

4. The controller of claim 1, comprising:
   authentication logic implemented at least hardware and configured to determine whether a reply received from the remote device in response to the beacon message includes security information that completes an authentication exchange with the remote device.

5. The controller of claim 4, wherein the authentication logic is configured to use the security information to determine a cryptographic key for communicating with the remote device.

6. The controller of claim 4, wherein the authentication logic is configured to determine whether the reply includes the security information by determining whether a cryptographic nonce of the remote device is encrypted based, at least in part, on the public key for the wireless device, and
   wherein the reply is an initial message transmitted to the wireless device from the remote device without intervening messages.

7. The controller of claim 1, wherein the security identifier in the beacon message is configured to cause the remote device to authenticate the wireless device by using the public key of the wireless device and a first cryptographic secret from the beacon message, and wherein the beacon message causes the remote device to provide a reply to the wireless device.

8. The controller of claim 7, wherein the beacon message is configured to cause the remote device to provide the reply to the wireless device by initiating an authentication process in the remote device, and wherein the reply includes a second cryptographic secret that completes a secure exchange between the wireless device and the remote device.

9. The controller of claim 1, wherein the security identifier is a hash of the public key, an identifier of the public key, or a certificate of the wireless device.

10. A method, comprising:
generating, by at least hardware of a wireless device, a beacon message, wherein the beacon message includes a security identifier that identifies a public key for the wireless device, wherein generating the beacon message includes generating the beacon message with the security identifier in a Counter Mode Cipher Block Chaining Message Authentication Code Protocol (CCMP) header of the beacon message, and
wherein the beacon message does not include the public key, wherein the security identifier causes a remote device to obtain the public key from a third party, and wherein the security identifier and an address of the wireless device correlate the wireless device with the public key of the wireless device when the remote device retrieves the public key from the third party; and
wirelessly transmitting, by the wireless device, the beacon message to announce to the remote device that the wireless device is available to communicate.

11. The method of claim 10, further comprising:
causing the remote device to initiate an authentication exchange with the wireless device by transmitting the security identifier in the beacon message, wherein a reply received from the remote device in response to the beacon message completes the authentication exchange.

12. The method of claim 10, comprising:
determining whether a reply received from the remote device in response to the beacon message includes security information, wherein transmitting the beacon message includes transmitting the beacon message to announce that the wireless device is available to provide access to a network, a mesh network, to direct services or to network memory, wherein wirelessly transmitting the beacon message includes transmitting the beacon message as a broadcast message, a multicast message or a peer-to-peer communication.

13. The method of claim 12, comprising:
authenticating the remote device using the security information from the reply, wherein the security information completes a secure exchange of a cryptographic key between the remote device and the wireless device.

14. The method of claim 12, further comprising:
determining whether the reply includes a cryptographic nonce of the remote device that is encrypted based, at least in part, on the public key for the wireless device, wherein the reply is an initial message to the wireless device from the remote device.

15. The method of claim 10, wherein the security identifier in the beacon message causes the remote device to authenticate the wireless device using the public key of the wireless device and a first cryptographic nonce from the beacon message, wherein the beacon message causes the remote device to provide a reply to the wireless device by initiating an authentication process in the remote device, and wherein the reply includes a second cryptographic nonce that completes a secure exchange between the wireless device and the remote device.

16. An integrated circuit, comprising:
transmitter logic implemented in at least hardware and configured to generate a message with a security identifier in a Counter Mode Cipher Block Chaining Message Authentication Code Protocol (CCMP) header of the message,
wherein the transmitter logic is configured to control a transmitter to wirelessly transmit the message, wherein the message is configured to announce to a remote device that a wireless device is available to communicate, wherein the message includes the security identifier for the wireless device,
wherein the message does not include a public key of the wireless device, wherein the security identifier causes the remote device to obtain the public key from a third party, and wherein the security identifier and an address of the wireless device correlate the wireless device with the public key of the wireless device when the remote device retrieves the public key from the third party; and
authentication logic implemented in at least hardware and configured to determine whether a reply received from the remote device in response to the message includes security information that completes an authentication exchange with the remote device.

17. The integrated circuit of claim 16, wherein the security identifier in the message is configured to cause the remote device to initiate an authentication exchange with the wireless device by causing the remote device to transmit the reply to the wireless device that includes security credentials of the remote device.

18. The integrated circuit of claim 16, wherein the security identifier identifies the public key of the wireless device, wherein the message transmitted by the wireless device indicates that the wireless device is available to provide access to a network, and wherein the message is a beacon message that is transmitted to a plurality of wireless devices.

19. The integrated circuit of claim 16, wherein the authentication logic is configured to use the security information to determine a cryptographic key for communicating with the remote device.

20. The integrated circuit of claim 16, wherein the authentication logic is configured to determine whether the reply includes the security information by determining whether a cryptographic nonce of the remote device is encrypted based, at least in part, on the public key for the wireless device, and wherein the reply is an initial message transmitted to the wireless device from the remote device without intervening messages.

* * * * *